United States Patent Office 2,822,261
Patented Feb. 4, 1958

2,822,261

METHOD OF SEPARATING METAL VALUES FROM AMMONIACAL SOLUTIONS

Vladimir Nicolaus Mackiw, David John Ivor Evans, and Naoyuki Yoshida, Fort Saskatchewan, Alberta, Canada No Drawing. Application February 25, 1957
Serial No. 641,854

7 Claims. (Cl. 75—103)

This invention relates to a method of precipitating from an ammoniacal solution values of metals, the sulphides of which are of lower solubility therein than nickel sulphide. The invention is particularly directed to the treatment of ammoniacal solutions which contain dissolved salts of at least one of the metals of the group consisting of nickel and cobalt, values of at least one other metal, the sulphide of which is of lower solubility in such solution than nickel, and at least one compound of the group polythionates having more than two sulphur atoms in their molecular structure and thiosulphate.

Hydrometallurgical processes for the extraction and recovery of metals such as nickel, copper and cobalt are becoming relatively well known in the metallurgical and chemical arts and are being employed successfully on a commercial scale. Such processes involve leaching the mineral sulphides with an acid or alkaline leach solution, preferably at elevated temperature and pressure, in the presence of a free oxygen bearing gas, such as air, oxygen enriched air or oxygen. The resulting leach solution containing dissolved salts of the metal or metals of interest is then subjected to treatment for the recovery of desired metal values as product metal or metals substantially free from impurities.

A process for the recovery of the metals nickel, copper and cobalt which is being operated very successfully on a commercial scale involves leaching mineral sulphides which contain values of the metals nickel, copper and cobalt with strong aqueous ammonia in the presence of a free oxygen bearing gas. This leaching method is described in detail in Patent No. 2,576,314. The resulting leach solution contains dissolved values of the metals nickel, copper and cobalt, thiosulphate, polythionates such as trithionate and tetrathionate, ammonium sulphate and ammonium sulphamate.

It has been found that values of metals, the sulphides of which are of lower solubility than nickel sulphide in ammoniacal solution, such as copper values, can be precipitated from this solution by heating the solution and reducing the free ammonia content as described in detail in Patent No. 2,693,404. Residual lower solubility metal values can be stripped from the solution by replenishing the thiosulphate and/or polythionate ions and continuing the heating until substantially all such metal values have been stripped from the solution as disclosed in Patent No. 2,693,405.

The solution, substantially free from dissolved lower solubility metal values is then reacted with a free oxygen bearing gas to convert thiosulphate and/or polythionate compounds to sulphates and is hydrolyzed to convert sulphamate to sulphate, leaving a residual solution from which the dissolved nickel and/or cobalt values can be recovered as product metal or metals substantially free from impurities.

It is found, in the operation of the oxidation and hydrolysis steps, that a substantial amount of ammonium sulphate must be present in the solution to prevent or at least minimize formation and precipitation of nickel and/or cobalt hydroxide. Such precipitation results either in loss of desired metal values or the precipitate must be subjected to separate treatment to recover the desired metals. Consequently, it is necessary to provide ammonium sulphate in the solution subjected to oxidation and hydrolysis in the amount of at least about 5 to 7 grams per litre for each gram per litre of nickel plus cobalt. The upper limit of ammonium sulphate concentration is safely below that at which there would be crystallization in the pipe lines, valves or other equipment.

We have found that the two stage lower solubility metal separation and stripping operations can be conducted in a single stage with important operating advantages such as, but not limited to, a substantial saving in time required for the operation, and the generation of heat necessary to maintain the temperature at which the operation is conducted with concurrent formation, in the solution, of ammonium sulphate necessary to inhibit or at least substantially restrict the formation and precipitation of nickel and/or cobalt hydroxide in the following oxidation and hydrolysis steps.

In the following description, an ammoniacal solution containing dissolved salts of nickel, copper and cobalt is treated according to the present invention to convert dissolved copper values to and precipitate them from the solution as copper sulphides. It will be understood that the present method is equally effective in separating, from such solutions, values of other metals the sulphides of which are of lower solubility in ammoniacal solution than nickel sulphide. Such other metals include, but are not necessarily limited to, silver, gold, ruthenium, germanium, tungsten, bismuth, platinum, cadmium, lead, rhodium, molybdenum, tin, osmium, vanadium, mercury, palladium, indium, arsenic, gallium and antimony.

The improved method of this invention for separating values of metals the sulphides of which are of lower solubility than nickel sulphide in ammoniacal solution from an ammoniacal solution containing, in solution, free ammonia, a salt of at least one such lower solubility metal, at least one salt of a metal of the group consisting of nickel and cobalt, and at least one sulphur compound of the group consisting of polythionates having more than two sulphur atoms in their molecular structure and thiosulphate, comprises the steps of adjusting the free ammonia content to that which will provide, on the addition of sulphuric acid to a pH value not less than about 7.2, a total ammonium surphate concentration in the solution of at least about 5 grams per litre per gram of nickel plus cobalt, adding sulphuric acid to the solution in amount sufficient to reduce the pH value of the solution to not less than about 7.2, whereby values of metals of lower solubility than nickel sulphide are precipitated from the solution, and separating precipitated metal values from the solution and there is provided in the solution a total ammonium sulphate concentration not less than about 5 grams per litre for each gram per litre nickel plus cobalt.

The following examples illustrate the operation of the method.

*Example 1*

A mineral sulphide concentrate containing 10–14% nickel, 1–2% copper, 0.3–0.4% cobalt, 28–34% sulphur and 33–40% iron, was leached with an aqueous solution containing about 100 g. p. l. ammonia at a temperature of from about 150°–220° F. and under a partial pressure of oxygen of about 25 pounds per square inch to produce a solution which contained about 100 g. p. l free ammonia, 45 g. p. l. nickel, 7 g. p. l. copper, 0.8 g. p. l. cobalt, 225 g. p. l. ammonium sulphate and an unsaturated sulphur (polythionates and thiosulphate) to copper ratio of from about 0.8 to 1.2:1. This solution was boiled at a temperature of from 190° to 193° F. for 6½ hours until the free ammonia content was reduced to about 2.3 mols per mol of nickel plus cobalt. At the end of the boiling period, the solution had a pH value of about pH 7.5 and contained 50 g. p. l. nickel, 1 g. p. l. cobalt, 1.5 g. p. l. copper and 250 g. p. l. ammonium sulphate. Steam used for maintaining the solution at the boiling temperature also served to replenish the solution with water and maintain the dissolved salts concentrations. Precipitated copper sulphide was separated from the solution and the solution was then reacted with hydrogen sulphide in slight excess of the stoichiometric sulphur equivalent of the dissolved copper content to precipitate the residual copper values as copper sulphide. Some nickel and cobalt values precipitated during this stripping operation. Ammonium sulphate was added to the solution to increase the concentration of that salt to 310 grams per litre, about 6.2 g. p. l. for each gram of dissolved nickel and cobalt, the amount required to inhibit formation and precipitation of nickel and cobalt hydroxide in the subsequent oxidation and hydrolysis steps.

*Example 2*

Solution from the leaching step having the same analysis of Example 1 above was heated at about its boiling temperature until the ammonia content was reduced to within the range of from about 40–50 grams per litre which corresponded to about 4 mols per mol of nickel plus cobalt. The pH value was reduced to 8 and the solution contained 5.0 g. p. l. copper at the end of this free ammonia content adjustment step. Sulphuric acid was then added to the solution in amount sufficient to reduce the ammonia to nickel plus cobalt molar ratio to 2.3:1 with a corresponding reduction of the pH value to 7.5. During the heating and sulphuric acid addition steps, dissolved copper values converted to and precipitated from the solution as copper sulphide. The resulting solution, after separation of precipitated copper values contained less than 0.05 gram per litre copper. The two operations required a total of only 4.5 hours. The copper sulphide precipitate contained 72.6% copper as copper sulphide, 0.57% nickel and 0.036% cobalt, substantially less nickel and cobalt than that which was present in the precipitate from the heating and stripping steps of Example 1.

The sulphuric acid can be added at any desired ammonia concentration. Usually, optimum results are obtained with respect to the rate and efficiency of the extraction of desired metal values, by maintaining, during leaching, a high concentration of free ammonia, of the order, for example, of 100 grams per litre. All this free ammonia could be converted to ammonium sulphate by the addition of sulphuric acid, if desired. However, that procedure would be uneconomic, unless warranted by the potential market for ammonium sulphate, due to the loss of useful ammonia from the circuit. Therefore, it is preferred to release free ammonia by heating to a concentration which, when reacted with sulphuric acid, will produce a total ammonium sulphate concentration in the solution of at least about 5 grams per litre per gram per litre of dissolved nickel plus cobalt. It will be understood, however, that the preliminary adjustment of the free ammonia content of the solution is intended to include the adjustment by any practical method, whether in the leaching stage, or by heating or by the addition of reagents which will react with the added sulphuric acid to provide the desired ammonium sulphate concentration. Making this adjustment by heating is preferred for the reasons that free ammonia is released and can be recovered for re-use in the leaching step and a large part of the dissolved copper is converted to and precipitated from the solution. Thus, for a solution which contains about 50 grams per litre nickel plus cobalt, the free ammonia content is adjusted to that at which, on the addition of sulphuric acid, will provide in the solution a total of at least about 250 grams ammonium sulphate and, preferably, between 2 to 3 mols of free ammonia per mol of nickel plus cobalt. The addition of sulphuric acid is then commenced. Concentrated sulphuric acid preferably is employed to avoid unnecessary dilution of the ammoniacal solution and, also, to obtain maximum benefit of the autogenously generated heat which substantially reduces the amount of heat normally required for the overall operation.

The following table further illustrates the results obtained in the operation of the invention. In each instance, the solution contained about 100 grams per litre free ammonia which was reduced to the desired extent in a preliminary boiling operation.

| $H_2SO_4$ Added | | Cu | Ni | Co | $NH_3$ Free | $(NH_4)_2SO_4$ | pH |
|---|---|---|---|---|---|---|---|
| Nil | Feed Sol, g. p. l. | 6.72 | 49.2 | 0.52 | 45.2 | 251 | 9.1 |
|  | End Sol, g. p. l. | 1.45 | 49.0 | 0.52 |  | 253 | 7.46 |
| 47.3 | End Sol, g. p. l. | 0.1 | 48.7 | 0.52 |  | 305 | 7.15 |
|  | Feed Sol, g. p. l. | 5.9 | 46.3 | Ni+Co | 51.3 | 209 | 9.8 |
| 51.3 | End Sol, g. p. l. | 0.095 | 44.8 | Ni+Co | 22 | 318 | 7.5 |
|  | Feed Sol, g. p. l. | 6.52 | 46.5 | Ni+Co | 47.2 | 216 | 9.5 |
| 47.8 | End Sol, g. p. l. | 0.036 | 47.0 | Ni+Co | 30 | 307 | 7.2 |

It will be noted that the copper content of the solution can be reduced from about 6.5 grams per litre to as low as about 0.036 gram per litre in a single stage operation in from 4 to 4½ hours by the addition of sulphuric acid during the boiling step. This is compared with a reduction of from 6.72 g. p. l. to 1.45 g. p. l. in 6½ hours when no acid is added. The pH value of the solution is not permitted to drop below pH 7.0 during this operation in view of the tendency of nickel values to precipitate from the solution as nickel ammonium sulphate as the pH is reduced below about 7.0.

The present method can be employed as a single stage operation to produce a nickel and/or cobalt bearing solution from which nickel and/or cobalt product metal can be produced which meets market specifications. However, if it is desired to obtain a solution which is substantially free from values of metals the sulphides of which are of lower solubility in the solution than nickel sulphide, the present method can be followed by a stripping operation. The present method still has important advantages over the prior art method in that there is a substantial saving of time and in the heat which otherwise would have to be supplied, and the residual contaminating metals are present in the solution in substantially smaller amounts, for example, from 0.036 to 0.05 g. p. l. as compared with 1.45 g. p. l. when the boiling step is conducted without the addition of sulphuric acid.

The present invention possesses several important advantages over the prior art method disclosed in Patent No. 2,693,404. Values of metals such as copper can be reduced below 0.05 gram per litre in a single stage operation with only very minor precipitation of nickel or cobalt salts. The operation is conducted at a pH above 7.0 and there is no apparent corrosion of equipment. As the time of the operation is substantially reduced, and at least a part of the heat is generated by the reaction between free ammonia and sulphuric acid, there is a substantial saving in the heat which normally is required for this operation.

What we claim as new and desire to protect by Letters Patent of the United States is:

1. In a method of separating values of metals the sulphides of which are of lower solubility in ammoniacal solution than nickel sulphide from an ammoniacal solution which contains, in solution, free ammonia, a salt of at least one such power solubility metal, at least one salt of a metal of the group consisting of nickel and cobalt, and at least one sulphur compound of the group consisting of polythionates having more than two sulphur atoms in their molecular structure and thiosulphate, the improvement which comprises the steps of adjusting the free ammonia content of the solution to that which will provide, on the addition of sulphuric acid to a pH value not less than about 7.2, a total ammonium sulphate concentration in the solution of not less than 5 grams per litre for each gram per litre of nickel plus cobalt, adding sulphuric acid to the solution in amount sufficient to reduce the pH value of the solution to not less than about pH 7.2, whereby values of metals of lower solubility than nickel sulphide are precipitated from the solution, and separating precipitated metal values from the solution.

2. The method according to claim 1 in which the free ammonia content of the solution is adjusted to a content which, on the addition of sulphuric acid to a pH value of not less than about 7.2, will provide a total of at least about 5 grams per litre ammonium sulphate for each gram per litre of nickel plus cobalt and a free ammonia content of at least about 2 mols for each mol of nickel plus cobalt.

3. The method according to claim 1 in which the ammonia content of the solution is adjusted by heating an ammoniacal solution which contains an excess of free ammonia.

4. The method according to claim 1 in which at least one of the metals the sulphide of which is of lower solubility than nickel sulphide in the ammoniacal solution is copper.

5. In a method of separating values of metals the sulphides of which are of lower solubility in ammoniacal solution than nickel sulphide from an ammoniacal solution which contains, in solution, free ammonia in excess of about 1 gram per litre for each gram per litre of nickel plus cobalt, a salt of at least one such lower solubility metal, at least one salt of a metal of the group consisting of nickel and cobalt, and at least one sulphur compound of the group consisting of polythionates having more than two sulphur atoms in their molecular structure and thiosulphate, the improvement which comprises the steps of adjusting the free ammonia content of the solution to not less than that which when reacted with sulphuric acid will produce in the ammoniacal solution a total ammonium sulphate concentration not less than about 5 grams per litre for each gram per litre of dissolved nickel plus cobalt, adding sulphuric acid to the solution in amount sufficient to reduce the ammonia content thereof to not less than about 2.0 mols per mol of nickel plus cobalt and the pH value of the solution to not less than about pH 7.2, whereby values of metals of lower solubility than nickel sulphide are precipitated from the solution, and separating precipitated metal values from the solution.

6. The method according to claim 5 in which the free ammonia content of the solution is adjusted by maintaining the solution at a temperature about its boiling temperature and the temperature is maintained during the addition of sulphuric acid to the solution.

7. The method according to claim 5 in which at least one of the metals the sulphide of which is of lower solubility than nickel sulphide in the ammoniacal solution is copper.

References Cited in the file of this patent

UNITED STATES PATENTS

| | | |
|---|---|---|
| 2,647,828 | McGauley | Aug. 4, 1953 |
| 2,693,404 | Mackiw | Nov. 2, 1954 |

FOREIGN PATENTS

| | | |
|---|---|---|
| 161,270 | Australia | Feb. 18, 1955 |